3,281,447
POLYHALOGENATED PHENYL-DIISOCYANATO PHENYLETHERS

Robert J. Knopf, St. Albans, and Thomas K. Brotherton, Charleston, W. Va., assignors to Union Carbide Corporation, a corporation of New York
No Drawing. Filed Sept. 20, 1963, Ser. No. 310,446
13 Claims. (Cl. 260—453)

This invention relates, in general, to novel polyhalogenated polyisocyanate ethers, sulfides, and selenides, and to a process for their preparation. More particularly, this invention relates to a novel class of polyhaloaryl polyisocyanatoaryl ethers, sulfides, and selenides, and to a process for their preparation. In one particular aspect, this invention relates to a novel sub-class of polyhaloaryl diisocyanatoaryl ethers, sulfides and selenides which are useful for application in self-extinguishing polyurethane systems.

Isocyanates are very reactive materials which condense readily with active hydrogen-containing compounds such as alcohols, amines, carboxylic acids, amides and water to form the corresponding carbamates, ureas, and the like. Additionally, the polyisocyanates can be homopolymerized to yield dimeric, trimeric and polymeric substances, or copolymerized to form valuable polymeric products. Isocyanate-containing copolymers have been found particularly useful in the preparation of polyurethane systems such as foams, fibers, films, coatings, elastomers and castings. For example, the polyisocyanates are useful in the preparation of flexible, high molecular weight polymers by condensing the polyisocyanate with polyols such as polyether glycols.

Inasmuch as the polyhalogenated polyisocyanate ethers, sulfides and selenides of this invention are all multifunctional, in that each compound must contain at least two isocyanate groups and two halogen atoms per molecule, they are particularly useful in the production of flameproof polyurethane systems, e.g., foams. The halogen atoms, i.e., chlorine, bromine and iodine, in the polyhalogenated polyisocyanates of this invention are extremely stable, relatively inert and unusually resistant to chemical reactions such as hydrolysis, displacement, hydrogenation and the like. These halogen atoms impart flame-retardant properties to the polyurethane systems derived from the polyhalogenated polyisocyanates of this invention. The polyhalogenated polyisocyanate ethers, sulfides and selenides of this invention, find further utility as chemical intermediates to carbamates, thiocarbamates, and ureas which are of value in agricultural and biological applications.

Accordingly, it is a general object of the present invention to provide novel polyhalogenated polyisocyanate ethers, sulfides, and selenides which are suitable for use in the plastic and resin field. A more specific object is to provide new polyhaloaryl polyisocyanatoaryl ethers, sulfides, and selenides containing high percentages of the halogens, chlorine, bromine, and iodine, which are especially useful flameproofing agents in polyurethanes. Another more specific object of this invention is to provide polyhaloaryl polyisocyanatoaryl ethers, sulfides, and selenides which must contain on different aryl moieties of the molecule at least two isocyanate groups and two halogen atoms, as hereinafter defined. A still further specific object is to provide novel polyhaloaryl diisocyanatoaryl ethers, sulfides, and selenides which are useful flameproofing agents in polyurethanes. Another specific object is to provide polyhalophenyl diisocyanatophenyl ethers, sulfides and selenides which are useful in preparing self-extinguishing polyurethane systems. A further specific object is to provide a novel process for the preparation of polyhaloaryl polyisocyanatoaryl ethers, sulfides, and selenides. These and other objects will readily become apparent to those skilled in the art to which this invention pertains from the ensuing description of the invention.

In a broad aspect, this invention is directed to a novel class of polyhaloaryl polyisocyanatoaryl ethers, sulfides, and selenides which include, as a particularly preferred sub-class, novel polyhaloaryl diisocyanatoaryl ethers, sulfides, and selenides, to be defined more fully hereinafter.

The novel class of polyhaloaryl polyisocyanatoaryl ethers, sulfides and selenides of this invention can be conveniently looked upon as binary compounds of oxygen, divalent sulfur and divalent selenium containing, respectively, an oxy (—O—), thio (—S—), and seleno (—Se—) linkage between two aryl moieties, one of said moieties containing at least two halogen atoms and the other of said moieties containing at least two isocyanate groups. They also can be looked upon as polyhaloaryl polyisocyanatoaryl ethers, sulfides, and selenides. It is a requirement of the present invention that the halogen atoms must be in one aryl ring and the isocyanate groups in the other aryl ring. It is a further requirement of this invention that there be at least two halogen atoms in one aryl ring and at least two isocyanate groups in the other aryl ring. The halogen atoms and the isocyanate groups must not be in the same aryl ring. The halogen atoms and isocyanate groups can occupy any position in their respective aryl rings without regard to problems of steric hinderance involving the oxy, thio, or seleno linkage. Positions ortho to the oxy, thio, or seleno linkage in each aryl ring can be substituted with their respective halogen atoms or isocyanate groups, as provided herein. In their respective rings, the halogen atoms and isocyanate groups can be meta, ortho, or para to each other. In a preferred form, the isocyanate groups are meta to each other.

The novel class of polyhaloaryl polyisocyanatoaryl ethers, sulfides, and selenides of this invention can be conveniently represented by formula (I):

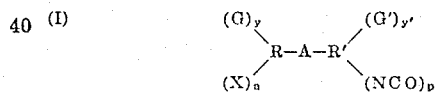

(I)

wherein A is either an oxy (—O—), thio (—S—), or seleno (—Se—) radical; R and R' are both aryl radicals; X is either the halogen, chlorine, bromine or iodine; G and G' are either alkyl, alkoxyl, cyano, carbalkoxy, or like groups; $n$ and $p$ are each positive whole numbers or integers of at least 2, whose upper limit is equal to the number of hydrogen atoms present on the unsubstituted parent groups R and R'; $y$ and $y'$ each can be zero or any positive whole number or integer whose sum does not exceed the number of positions which would normally be occupied by hydrogen atoms in the unsubstituted parent groups R and R', minus the value of $n$ and $p$.

Illustrative of maximum values for $n$ or $p$ are: 5 when R and R' are both phenyl; 7 when R and R' are both naphthyl; 9 when R and R' are both anthryl or phenanthryl; 5 for $n$ when R is phenyl and 7 for $p$ when R' is naphthyl; and so forth. The sums of $y$, $y'$, $n$ and $p$ must not exceed the number of positions which would normally be occupied by hydrogen atoms in the unsubstituted parent groups R and R', with the proviso that both $n$ and $p$ each must have a value of at least 2. All the above variables and whole numbers can be the same or different, with any combination thereof permissible, within the terms of the aforementioned limits and proviso.

Preferred members of the novel class of polyhaloaryl polyisocyanatoaryl ethers, sulfides, and selenides represented by Formula I are those wherein A is either an oxy (—O—), thio (—S—), or seleno (—Se—) radical; R and R' are each aryl of from 6 to 14 carbon atoms; X is either chlorine, bromine, or iodine; $n$ and $p$ are each a positive whole number of from 2 to 9, inclusive, and $y$ and $y'$ are each zero. Particularly preferred members of the aforementioned novel class of polyhaloaryl polyisocyanatoaryl ethers, sulfides, and selenides represented by Formula I are those wherein A is an oxy (—O—) radical; R and R' are each aryl of from 6 to 14 carbon atoms; X is either chlorine, bromine, or iodine; $n$ and $p$ each have a value of from 2 to 9, inclusive; and $y$ and $y'$ are each zero.

The most preferred polyhaloaryl polyisocyanatoaryl ethers, sulfides, and selenides of this invention are those of the sub-class polyhaloaryl diisocyanatoaryl ethers, sulfides, and selenides which can be represented by Formula II:

(II) 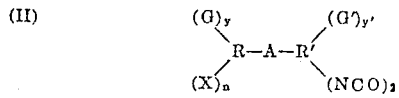

wherein A is either an oxy (—O—), thio (—S—), or seleno (—Se—) radical; R and R' are each aryl of from 6 to 14 carbon atoms; X is chlorine, bromine, or iodine; G and G' are each either alkyl, alkoxyl, cyano, carbalkoxy, or like groups; $n$ is a positive whole number of from 2 to 9, inclusive, and $y$ and $y'$ each can be zero or any positive whole number from 1 to 7, inclusive. A preferred group of polyhaloaryl diisocyanatoaryl ethers, sulfides and selenides represented by Formula II are those wherein A is an oxy (—O—), thio (—S—), or seleno (—Se—) radical; R and R' are each aryl of from 6 to 14 carbon atoms; X is chlorine, bromine, or iodine; $n$ is a positive whole number of from 2 to 9 inclusive; and $y$ and $y'$ are both zero. Particularly preferred polyhaloaryl diisocyanatoaryl ethers, sulfides, and selenides represented by Formula II are those of Formula III:

(III) 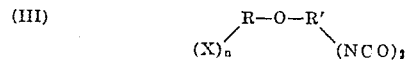

wherein R and R' are each aryl of from 6 to 14 carbon atoms; X is chlorine, bromine, or iodine; and $n$ has a value of from 2 to 9, inclusive. The most preferred polyhaloaryl diisocyanatoaryl ethers, sulfides, and selenides of this invention, and represented by Formula III, are those wherein R and R' are each phenyl or naphthyl, especially phenyl, X is chlorine, bromine, or iodine, especially chlorine and bromine; and $n$ has a value of from 2 to 7, inclusive.

Representative polyhaloaryl polyisocyanatoaryl ethers, sulfides, and selenides encompassed within this invention include, among others, 2,4,6-trichlorophenyl 2,4-diisocyanatophenyl ether;
2,6-dichlorophenyl 2,4-diisocyanatophenyl ether;
2,3-diiodophenyl 2,4-diisocyanatophenyl sulfide;
3,4-dichlorophenyl 2,4-diisocyanatophenyl ether;
pentachloropenyl 2,6-diisocyanatophenyl ether;
2,4-dibromo-6-hydroxyphenyl 2,4,6-triioscyanatophenyl ether;
4,6-dichloro-2-methoxyphenyl 2,4-diisocyanatophenyl ether;
2,3-dibromo-4,6-dicyanophenyl 2,6-diisocyanatophenyl ether;
pentachlorophenyl 2,5-diisocyanatophenyl selenide;
2,4-dichloro-6-cyanophenyl 2,4-diisocyanatophenyl ether;
2,4-diiodo-3-methoxyphenyl 2,4,6-triisocyanatophenyl ether;
2,4-dibromo-6-methylphenyl 2,4,6-triisocyanatophenyl ether;
2,4,6-triiodophenyl 2,4,6-triisocyanatophenyl ether;
2,4,6-tribromophenyl 2,4-diisocyanatophenyl sulfide;
2,4,6-triiodophenyl 2,4,6-triisocyanatophenyl selenide;
4,7-dichloro-β-naphthyl 2,4,6-triisocyanatophenyl selenide;
5,7-dibromo-β-naphthyl 2,4-dibromo-6,8-diisocyanato-α-naphthyl ether;
pentachlorophenyl 2,4-diisocyanatophenyl selenide;
2,4,6-trichlorophenyl 1,6-diisocyanato-β-anthryl ether;
pentachlorophenyl 2,4,6-triisocyanatophenyl ether;
pentachlorophenyl 2,4,6-triisocyanatophenyl sulfide;
pentachlorophenyl 2,4,5-triisocyanatophenyl selenide;
pentabromophenyl 2,6-diisocyanatophenyl ether;
pentachlorophenyl 2,4-diisocyanato-6-cyanophenyl ether;
pentachlorophenyl 2,3-diisocyanato-4-carbethoxyphenyl ether;
and the like.

The polyhaloaryl diisocyanatoaryl ethers, sulfides, and selenides represented by Formula II, are the preferred sub-class of this invention, and additional representative members of this sub-class are:

pentachlorophenyl 2,4-diisocyanatophenyl ether;
pentachlorophenyl 2,6-diisocyanatophenyl ether;
pentachlorophenyl 5,6-diisocyanatophenyl ether;
pentachlorophenyl 3,4-diisocyanatophenyl ether;
pentachlorophenyl 2,3-diisocyanatophenyl ether;
pentachlorophenyl 2,4-diisocyanatophenyl sulfide;
petachlorophenyl 2,4-diisocyanatophenyl selenide;
pentabromophenyl 2,4-diisocyanatophenyl ether;
pentabromophenyl 2,4-diisocyanatophenyl sulfide;
pentabromophenyl 2,4-diisocyanatophenyl selenide;
pentachlorophenyl 1,6-diisocyanate-β-naphthyl ether;
pentachlorophenyl 1,6-diisocyanato-β-naphthyl sulfide;
pentachlorophenyl 1,6-diisocyanato-β-naphthyl selenide;
pentabromophenyl 1,6-diisocyanato-β-naphthyl ether;
pentabromophenyl 1,6-diisocyanato-β-naphthyl sulfide;
pentabromophenyl 1,6-diisocyanato-β-naphthyl selenide;
pentachlorophenyl 1,6-diisocyanato-β-anthryl ether;
pentachlorophenyl 1,6-diisocyanato-β-anthryl sulfide;
pentachlorophenyl 1,6-diisocyanato-β-anthryl selenide;
2,4,6-tribromophenyl 2,4-diisocyanatophenyl ether;
2,4,6-tribromophenyl 2,4-diisocyanatophenyl sulfide;
2,4,6-tribromophenyl 2,4-diisocyanatophenyl selenide;
4,7-dibromo-β-naphthyl 2,4-diisocyanatophenyl ether;
4,7-dibromo-β-naphthyl 2,4-diisocyanatophenyl sulfide;
4,7-dibromo-β-naphthyl 2,4-diisocyanatophenyl selenide;
2,4-diiodophenyl 2,4-diisocyanatophenyl ether;
2,4-diiodophenyl 2,4-diisocyanatophenyl sulfide;
2,4-diiodophenyl 2,4-diisocyanatophenyl selenide;
2,3,4-trichlorophenyl 2,6-diisocyanatophenyl ether;
4,5,6-tribromophenyl 3,4-diisocyanatophenyl sulfide;
2,4,6-triiodophenyl 2,6-diisocyanatophenyl selenide;
2,4-dichloro-6-methylphenyl 2,4-diisocyanatophenyl ether;
2,4-dibromo-6-methoxyphenyl 2,5-diisocyanatophenyl ether;
4,7-dichloro-β-naphthyl 4,7-diisocyanato-β-napthyl ether;
4,7-dichloro-β-naphthyl 4,7-diisocyanato-β-naphthyl sulfide;
4,7-dichloro-β-naphthyl 4,7-diisocyanato-β-naphthyl selenide;
2,3,4,5,6,7,8-heptachloro-α-naphthyl 1,6-diisocyanato-β-naphthyl ether;
2,3,4,5,6,7,8-heptachloro-α-naphthyl 1,6-diisocyanato-β-naphthyl sulfide;
2,3,4,5,6,7,8-heptachloro-α-naphthyl 1,6-diisocyanato-β-napthyl selenide;
6,7,8,9-tetrachloro-β₅anthryl 1,6-diisocyanato-β-anthryl ether;
6,7,8,9-tetrachloro-β-anthryl 1,6-diisocyanato-β-anthryl sulfide;
6,7,8,9-tetrachloro-β-anthryl 1,6-diisocyanato-β-anthryl selenide;
and the like.

In general, the polyhaloaryl polyisocyanatoaryl ethers, sulfides, and selenides of this invention can be conveniently prepared from the corresponding polyhaloaryl polyaminoaryl ethers, sulfides and selenides by reaction with a carbonyl dihalide, e.g., phosgene. The polyhaloaryl polyisocyanatoaryl ethers, sulfides, and selenides of this invention are preferably prepared by phosgenation of the corresponding polyhaloaryl polyaminoaryl precursors.

The preparation of the polyhaloaryl polyaminoaryl ether, sulfide, and selenide precursors, used as starting materials for the polyhalogenated polyisocyanates of this invention, are the subject matter of copending application Serial Number 310,461, filed herewith and incorporated herein by reference.

Briefly, the polyhaloaryl polyaminoaryl precursors are obtained from the corresponding polyhaloaryl polynitroaryl ethers, sulfides, and selenides by chemical or catalytic reduction, e.g., with iron and acid, or by catalytic hydrogenation. The polyhaloaryl polynitroaryl precursors can be obtained by polynitro-arylation of the appropriate polyhalophenols, naphthols, anthrols, and phenanthrols, and corresponding thiols and selenols, by reaction with a polynitrohalobenzene, naphthalene, anthracene or phenanthrene in the presence of alkali.

In general, the conversion of the polyhaloaryl polyaminoaryl ethers, sulfides, and selenides to the corresponding polyhaloaryl polyisocyanatoaryl compounds is accomplished by sparging a carbonyl dihalide, more preferably phosgene, through a slurry of the polyhaloaryl polyaminoaryl ethers, sulfides, and selenides contained in an inert normally-liquid reaction medium at a temperature within the range of from about 75° C. to about 200° C., more preferably from about 125° C. to about 175° C.

In general, the normally-liquid reaction medium employed in the conversion of the polyaminoaryl precursors to the corresponding novel polyisocyanates must be inert to the reactants and stable under the conditions employed. Moreover, it should be easily separable from the resulting polyisocyanates. Typical inert, liquid solvents which have been found suitable for utilization as media in the process of the present invention include, among others, aromatic hydrocarbons such as toluene, xylene, naphthalene, tetrahydronaphthalene, benzene, diphenyl, cymene, amylbenzene; cycloaliphatic hydrocarbons such as cyclohexane; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methyl isobutyl ketone, methyl hexyl ketone, diisopropyl ketone; and other solvents such as nitrobenzene, tetramethylene sulfone; and the like. The chlorinated aromatic hydrocarbons are preferred as solvents.

Although reaction temperatures within the aforementioned range of from about 75° C. to about 200° C., and more preferably from about 125° C. to about 175° C. have been found desirable, temperatures above and below this range can also be employed. However, from economic considerations the optimum yield and rate of reaction are attained within the aforesaid ranges.

Pressure is in no wise critical and the instant process can be conducted at atmospheric, subatmospheric and superatmospheric pressures.

Although the process for preparing the polyhaloaryl polyisocyanatoaryl compounds from the corresponding polyaminoaryl precursors preferably is conducted with phosgene, in its broadest concept the process includes the utilization of any carbonyl dihalide such as carbonyl dibromide. However, for economic considerations phosgene is the preferred carbonyl dihalide. In the preparation of the novel polyhaloaryl polyisocyanatoaryl compounds of this invention, phosgene can be used in either the gaseous or liquid form, preferably liquid form.

Inasmuch as the yield and rate of formation of the polyhaloaryl polyisocyanatoaryl compounds are dependent upon several variables, for example, concentration of the polyaminoaryl precursor, solubility of the precursor, and phosgene in the reaction medium, reaction temperature, pressure and rate of addition of the phosgene, no hard and fast rule can be devised regarding the optimum conditions to be employed.

In a preferred embodiment for the conversion of the polyaminoaryl precursors to the polyisocyanates, a o-dichlorobenzene solution containing the precursor was gradually added to a solution of phosgene in o-dichlorobenzene over a period of approximately 30 minutes. Thereafter phosgene is subsequently sparged through the reaction mixture for about 5 hours while the temperature is raised to about 100° C. After removal of the by-product hydrogen chloride and the solvent a crude polyisocyanate product is obtained which can be refined by known purification techniques such as distillation, recrystallization, and the like.

In practice, it has been found that the mol ratio of phosgene to polyaminoaryl precursor in the initial reaction medium preferably should be in excess of 3:1, although satisfactory results have been obtained at a lower ratio. When the phosgene subsequently is sparged into the reaction medium feed rates of up to about 10 mols of phosgene per mole of amine per hour are preferred.

In particular, for more illustrative purposes only, the polyhaloaryl polyisocyanatoaryl ethers of this invention can be most conveniently prepared by the reaction of liquid phosgene with the corresponding polyhaloaryl polyaminoaryl precursors. For example, pentachlorophenyl 2,4-diisocyanatophenyl ether (A) can be obtained by phosgenation of pentachlorophenyl 2,4-diaminophenyl ether (B) with liquid phosgene (C) according to the following reaction scheme:

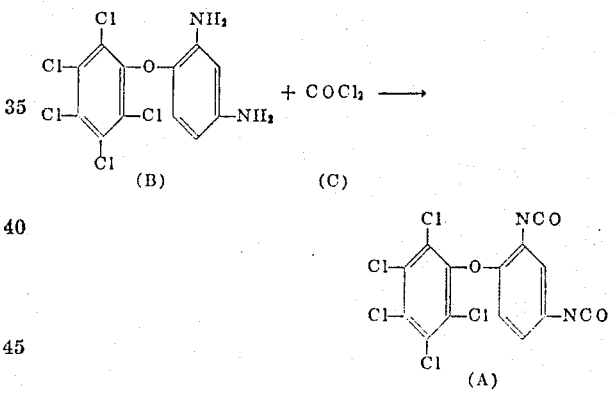

In the above reaction scheme, pentachlorophenyl 2,4-diaminophenyl ether (B) is obtained from pentachlorophenyl 2,4-dinitrophenyl ether by catalytic reduction with Raney nickel and hydrogen. The pentachlorophenyl 2,4-dinitrophenyl ether is obtained by 2,4-dinitrophenylation of pentachlorophenol with 2,4-dinitrochlorobenzene in the presence of alkali.

In general, the polyhaloaryl polyaminoaryl ethers, sulfides, and selenides used as starting materials for the polyhaloaryl polyisocyanatoaryls of this invention can be represented by Formula IV:

(IV) 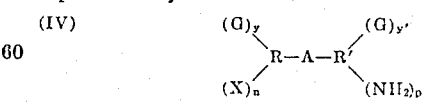

wherein A, R, R', X, G, G', $n$, $y$ and $y'$ are as defined with reference to Formula I.

The most preferred polyhaloaryl polyisocyanatoaryl ethers, sulfides, and selenides of this invention, that is those of the sub-class polyhaloaryl diisocyanatoaryl ethers, sulfides, and selenides, can be prepared from polyhaloaryl diamino precursors of Formula V:

(V) 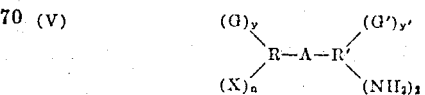

wherein A, R, R', X, G, G', $n$, $y$, and $y'$ are as defined with reference to Formula III.

The particularly preferred polyhaloaryl diisocyanatoaryl ethers, sulfides, and selenides represented by Formula III are prepared from the corresponding polyhaloaryl diaminoaryl precursors represented by Formula VI:

(VI) 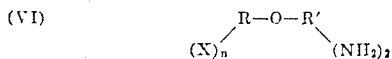

wherein R, R', and n are as defined with reference to Formula III.

Representative starting polyhaloaryl polyaminoaryl ethers, sulfides, and selenides which can be used to prepare the polyhaloaryl polyisocyanatoaryl ethers, sulfides, and selenides of this invention are, among others, 2,4-dichloro-6-cyanophenyl 2,4-diaminophenyl ether;
2,4-diiodo-3-methoxyphenyl 2,4,6-triaminophenyl ether;
2,4-dibromo-6-methylphenyl 2,4,6-triaminophenyl ether;
2,4,6-triiodophenyl 2,4,6-triaminophenyl ether;
2,4,6-tribromophenyl 2,4-diaminophenyl sulfide;
2,4,6-triiodophenyl 2,4,6-triaminophenyl selenide;
4,7-dichloro-β-naphthyl 2,4,6-triaminophenyl selenide;
5,7-β-naphthyl 2,4-dibromo-6,8-diamino-β-naphthyl ether;
pentachlorophenyl 2,4-diaminophenyl selenide;
pentachlorophenyl 2,4-diaminophenyl ether;
pentachlorophenyl 2,4-diaminophenyl sulfide;
pentabromophenyl 2,4-diaminophenyl ether;
pentabromophenyl 2,4-diaminophenyl sulfide;
pentabromophenyl 2,4-diaminophenyl selenide;
pentachlorophenyl 2,6-diaminophenyl ether;
pentachlorophenyl 2,6-diaminophenyl sulfide;
pentachlorophenyl 2,6-diaminophenyl selenide;
pentachlorophenyl 1,6-diamino-β-naphthyl ether;
pentachlorophenyl 1,6-diamino-β-naphthyl sulfide;
pentachlorophenyl 1,6-diamino-β-naphthyl selenide;
pentabromophenyl 1,6-diamino-β-naphthyl ether;
pentabromophenyl 1,6-diamino-β-naphthyl sulfide;
pentabromophenyl 1,6-diamino-β-naphthyl selenide;
pentachlorophenyl 1,6-diamino-β-anthryl ether;
pentachlorophenyl 1,6-diamino-β-anthryl sulfide;
pentachlorophenyl 1,6-diamino-β-anthryl selenide;
2,4,6-tribromophenyl 2,4-diaminophenyl ether;
2,4,6-tribromophenyl 2,4-diaminophenyl sulfide;
2,4,6-tribromophenyl 2,4-diaminophenyl selenide;
4,7-dibromo-β-naphthyl 2,4-diaminophenyl ether;
4,7-dibromo-β-naphthyl 2,4-diaminophenyl sulfide;
4,7-dibromo-β-naphthyl 2,4-diaminophenyl selenide;
2,4-diiodophenyl 2,4-diaminophenyl ether;
2,4-diiodophenyl 2,4-diaminophenyl sulfide;
2,4-diiodophenyl 2,4-diaminophenyl selenide;
4,7-dichloro-β-naphthyl 4,7-diamino-β-naphthyl ether;
4,7-dichloro-β-naphthyl 4,7-diamino-β-naphthyl sulfide;
4,7-dichloro-β-naphthyl 4,7-diamino-β-naphthyl selenide;
2,3,4,5,6,7,8-heptachloro-α-naphthyl 1,6-diamino-β-naphthyl ether;
2,3,4,5,6,7,8-heptachloro-α-naphthyl 1,6-diamino-β-naphthyl sulfide;
2,3,4,5,6,7,8-heptachloro-α-naphthyl 1,6-diamino-β-naphthyl selenide;
6,7,8,9-tetrachloro-β-anthryl 1,6-diamino-β-anthryl ether;
6,7,8,9-tetrachloro-β-anthryl 1,6-diamino-β-anthryl sulfide;
6,7,8,9-tetrachloro-β-anthryl 1,6-diamino-β-anthryl selenide;
and the like.

The following examples are illustrative of the polyhalogenated polyisocyanates of this invention and their preparation.

*Example I.—Pentachlorophenyl 2,4-diisocyanatophenyl ether*

To a 1000 cc., 3-neck glass kettle equipped with stirrer, reflux condenser, thermometer and gas sparger tube, was charged a mixture of 200 cc. o-dichlorobenzene and 30 g. of liquid phosgene. The charge was cooled to −10° C. and 18 g. of pentachlorophenyl 2,4-diaminophenyl ether was added in one portion. The temperature was then allowed to rise slowly to +25° C., after which external heat was applied and phosgene was sparged through the suspension until a temperature of 150° C. was reached. This temperature was maintained until a clear solution was obtained and hydrogen chloride evaluation ceased. Excess phosgene was removed by sparging vigorously with dry nitrogen, the charge was filtered and the solvent was removed by distillation at reduced pressure. There was obtained pentachlorophenyl 2,4-diisocyanatophenyl ether as a crude solid (16.5 g.), which melted at 89–98° C. Vacuum sublimation at 175–190°/0.1 mm. produced 10.5 g. (50.0 percent yield) of refined pentachlorophenyl 2,4-diisocyanatophenyl ether in the form of slender, white needles, M.P. 106–110° C.

*Analysis.*—Calc. for $C_{14}H_3N_2O_3Cl_5$: C, 39.57; H, 0.76; N, 6.60; Cl, 41.81. Found: C, 39.62; H, 0.71; N, 6.67; Cl, 41.80.

*Example II.—2,4,6-tribromophenyl 2,4-diisocyanatophenyl ether*

To the same type of equipment described in Example I, was charged at a temperature of −10° C. a mixture of 150 cc. o-dichlorobenzene and 27 g. of liquid phosgene. To the mixture was added 17 g. of 2,4,6-tribromophenyl 2,4,-diaminophenyl ether through a powder funnel over a 15 minute period. The temperature of the mixture was allowed to rise gradually to +25° C., after which heating was commenced and phosgene was sparged through the suspension. The temperature was maintained at 130–135° C. until hydrogen chloride evaluation had ceased and the infrared spectrum of two successive samples indicated no change in the degree of absorption of the —NCO band at 4.45. At this point, excess phosgene was removed by nitrogen sparging, the charge was filtered and the solvent was removed by stripping distillation at 10 mm. Hg pressure. There was obtained 2,4,6-tribromophenyl 2,4-diisocyanatophenyl ether as a light brown solid (15.0 g.) (78.5 percent yield) which melted from 96–98° C. and had an indicated purity of 96.1 percent by isocyanate analysis.

*Analysis.*—Calc. for $C_{14}H_5N_2O_3Br_3$: C, 34.35; H, 1.02; N, 5.73. Found: C, 34.39; H, 1.29; N, 5.91.

*Example III.—Pentabromophenyl 2,4-diisocyanatophenyl ether*

In a manner similar to the preparation of the diisocyanate of Example II, pentabromophenyl 2,4-diisocyanatophenyl ether is obtained from liquid phosgene and pentabromophenyl 2,4-diaminophenyl ether.

*Example IV.—Pentachlorophenyl 1,6-diisocyanato-β-naphthyl ether*

In a manner similar to the preparation of the diisocyanate of Example II, pentachlorophenyl 1,6-diisocyanate-β-naphthyl ether is obtained from liquid phosgene and pentachlorophenyl 1,6-diamino-β-naphthyl ether.

*Example V.—Pentachlorophenyl 1,6-diisocyanato-β-anthryl ether*

In a manner similar to the preparation of the diisocyanate of Example II, pentachlorophenyl 1,6-diisocyanato-β-anthryl ether is obtained from liquid phosgene and pentachlorophenyl 1,6-diamino-β-anthryl ether.

*Example VI.—4,7-dibromo-β-naphthyl 2,4-diisocyanatophenyl sulfide*

In a manner similar to the preparation of the diisocyanate of Example II, 4,7-dibromo-β-naphthyl 2,4-diisocyanatophenyl sulfide is obtained from liquid phosgene and 4,7-dibromo-β-naphthyl 2,4-diaminophenyl sulfide.

*Example VII.—2,4-diiodophenyl 2,4-diisocyanatophenyl ether*

In a manner similar to the preparation of the diisocyanate of Example II, 2,4-diiodophenyl 2,4-diisocyanatophenyl ether is obtained from liquid phosgene and 2,4-diiodophenyl 2,4-diaminophenyl ether.

*Example VIII.—Pentachlorophenyl 2,4-diisocyanatophenyl sulfide*

In a manner similar to the preparation of the diisocyanate of Example II, pentachlorophenyl 2,4-diisocyanatophenyl sulfide is obtained from liquid phosgene and pentachlorophenyl 2,4-diaminophenyl sulfide.

*Example IX.—Pentachlorophenyl 2,4-diisocyanatophenyl selenide*

In a manner similar to the preparation of the diisocyanate of Example II, pentachlorophenyl 2,4-diisocyanatophenyl selenide is obtained from liquid phosgene and pentachlorophenyl 2,4-diaminophenyl selenide.

Those skilled in the art will readily recognize that other polyhalogenated polyisocyanates encompassed within this invention can be prepared from liquid phosgene and the desired polyamine precursor, as disclosed in the aforementioned examples.

In general, the polyhaloaryl polyisocyanatoaryl ethers, sulfides, and selenides which have a maximum number of halogen atoms on the aryl ring are preferred compounds of this invention for use in self-extinguishing polyurethane systems since they possess better flame-retardant properties.

It has been found that with increased halogen content of the aryl ring there is a corresponding increase in flame-retardant properties, with maximum flame-retardant properties occuring with maximum halogen content.

Although this invention has been illustrated by the preceding examples, it is not to be construed as limited to the materials employed therein, but rather, this invention encompasses the broad class of polyhaloaryl polyisocyanatoaryl ethers, sulfides, and selenides as hereinbefore disclosed. Various modifications and embodiments of this invention can be made without departing from the spirit and scope thereof.

What is claimed is:

1. Polyhalogenated polyisocyanates of the formula:

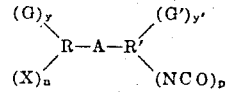

wherein A is selected from the group consisting of oxy (—O—), thio (—S—), and seleno (—Se—) radicals; R and R' are each aryl radicals of from 6 to 14 carbon atoms; X is selected from the group consisting of chlorine, bromine, and iodine; G and G' are each selected from the group consisting of methyl, methoxy, cyano, carbethoxy radicals; $n$ and $p$ are each integers of at least 2, whose upper limit is equal to the number of hydrogen atoms present in the unsubstituted aryl groups R and R'; $y$ and $y'$ are each selected from the group consisting of zero and integers of from 1 to 7.

2. Polyhalogenated polyisocyanates of the formula:

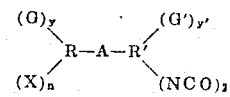

wherein A is selected from the group consisting of oxy (—O—), thio (—S—), and seleno (—Se—) radicals; R and R' are each aryl of from 6 to 14 carbon atoms; X is selected from the group consisting of chlorine, bromine, and iodine; G and G' are each selected from the group consisting of methyl, methoxy, cyano, carbethoxy radicals; $n$ is an integer of from 2 to 9, inclusive; and $y$ and $y'$ are each selected from the group consisting of zero and integers of from 1 to 7, inclusive.

3. Polyhalogenated polyisocyanates of the formula:

wherein A is selected from the group consisting of oxy (—O—), thio (—S—), and seleno (—Se—) radicals; R and R' are each aryl of from 6 to 14 carbon atoms; X is selected from the group consisting of chlorine, bromine, and iodine; and $n$ is an integer of from 2 to 9, inclusive.

4. Polyhalogenated polyisocyanates of the formula:

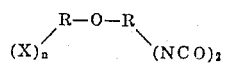

wherein R and R' are each aryl of from 6 to 14 carbon atoms; X is selected from the group consisting of chlorine, bromine, and iodine; and $n$ is an integer of from 2 to 9, inclusive.

5. Pentachlorophenyl 2,4-diisocyanatophenyl ether.
6. 2,4,6-tribromophenyl 2,4-diisocyanatophenyl ether.
7. Pentabromophenyl 2,4-diisocyanatophenyl ether.
8. Pentachlorophenyl 1,6-diisocyanato - β - naphthyl ether.
9. Pentachlorophenyl 1,6-diisocyanato-β-anthryl ether.
10. 4,7 - dibromo-β-naphthyl 2,4 - diisocyanatophenyl sulfide.
11. 2,4-diiodophenyl 2,4-diisocyanatophenyl ether.
12. Pentachlorophenyl 2,4-diisocyanatophenyl sulfide.
13. Pentachlorophenyl 2,4-diisocyanatophenyl selenide.

References Cited by the Examiner

UNITED STATES PATENTS

| | | | |
|---|---|---|---|
| 2,786,864 | 3/1957 | Wirth et al. | 260—453 |
| 3,041,364 | 6/1962 | McShane et al. | 260—453 |

OTHER REFERENCES

Thorne et al., Inorganic Chemistry, 1943, 4th edition, pp. 519 and 923.

CHARLES B. PARKER, *Primary Examiner.*

JOSEPH P. BRUST, *Examiner.*

DALE R. MAHANAND, *Assistant Examiner.*